United States Patent
Dainez et al.

(10) Patent No.: US 7,550,941 B2
(45) Date of Patent: Jun. 23, 2009

(54) LINEAR-COMPRESSOR CONTROL SYSTEM, A METHOD OF CONTROLLING A LINEAR COMPRESSOR, A LINEAR COMPRESSOR AND COOLING SYSTEM

(75) Inventors: Paulo Sérgio Dainez, Joinville-SC (BR); Dietmar Erich Bernhard Lilie, Joinville-SC (BR)

(73) Assignee: Empresa Brasileira de Compressores S.A.- EMBRACO, Joinville-SC (BR)

( * ) Notice: Subject to any disclaimer, the term of this patent is extended or adjusted under 35 U.S.C. 154(b) by 572 days.

(21) Appl. No.: 10/540,910

(22) PCT Filed: Jan. 8, 2004

(86) PCT No.: PCT/BR2004/000002
§ 371 (c)(1),
(2), (4) Date: Mar. 3, 2006

(87) PCT Pub. No.: WO2004/063569
PCT Pub. Date: Jul. 29, 2004

(65) Prior Publication Data
US 2006/0171814 A1    Aug. 3, 2006

(30) Foreign Application Priority Data
Jan. 8, 2003    (BR)    .................................... 0300010

(51) Int. Cl.
*F04B 35/04*    (2006.01)
*F04B 49/06*    (2006.01)

(52) U.S. Cl. .................... 318/608; 318/437; 318/504

(58) Field of Classification Search ......... 318/430–434, 318/437, 443, 459, 471, 504, 606–608
See application file for complete search history.

(56) References Cited
U.S. PATENT DOCUMENTS
4,345,442 A * 8/1982 Dorman ....................... 62/160

(Continued)

FOREIGN PATENT DOCUMENTS
| | | |
|---|---|---|
| EP | 0864750 | 9/1998 |
| WO | WO-01/54253 | 7/2001 |
| WO | WO-02/095923 | 11/2002 |

OTHER PUBLICATIONS

International Search Report for PCT/BR2004/000002 completed Apr. 15, 2004.

(Continued)

*Primary Examiner*—Bentsu Ro
(74) *Attorney, Agent, or Firm*—Alston & Bird LLP (57) ABSTRACT

The present invention relates to a system of controlling a piston in a linear compressor, a method of controlling a piston in a linear compressor, as well as a linear compressor, particularly applicable to cooling systems that may include, for instance, refrigerators, air-conditioning systems and the like. The objectives of the present invention are a system for controlling a linear compressor (10), the linear compressor (10) comprising a movable assembly (1), a motor (1) fed by an application voltage ($V_T$) generating a current circulating in the motor (1'), an electronic switching device (52), and an electronic circuit (51) controlling the electronic switching device (52) to control the application voltage (VT) applied to the motor (1'), and the motor (1) driving the movable assembly (1), the electronic circuit (51) measuring an actuation phase ($\phi_c$) of the current circulating in the motor (1') and a dynamic phase (φp) of the movable assembly (1) and establishing a relationship between the actuation phase ($\phi_c$) and the dynamic phase (φp) determining a measured phase (φpc), the electronic circuit (51) obtaining a value of a correction voltage ($V_F$) from the value of the measured phase (φpc) the electronic circuit (51) obtaining a value of a defined voltage (Vp) front a physical position (DP) of the movable assembly (1), the electronic circuit (51) actuating on the value of applied voltage ($V_T$) from the sum of the correction voltage (VF) and the defined voltage (Vp). A method or controlling a linear compressor, a linear compressor and a cooling system are also objectives of the present invention.

21 Claims, 7 Drawing Sheets

U.S. PATENT DOCUMENTS

| | | | |
|---|---|---|---|
| 5,342,176 A | | 8/1994 | Redlich |
| 5,534,760 A | * | 7/1996 | Jung .......................... 318/442 |
| 5,980,211 A | | 11/1999 | Tojo et al. |
| 6,851,934 B2 | * | 2/2005 | Yoo et al. ................ 417/44.11 |
| 2002/0093327 A1 | | 7/2002 | Yoo et al. |
| 2003/0129063 A1 | * | 7/2003 | Jeun ............................ 417/45 |
| 2003/0164691 A1 | | 9/2003 | Ueda et al. |

OTHER PUBLICATIONS

International Preliminary Report on Patentability for PCT/BR2004/000002 completed Dec. 15, 2004.

Written Opinion of the International Searching Authority for PCT/BR2004/000002.

* cited by examiner

Voltage ——
Phase - - -

LINEAR-COMPRESSOR CONTROL SYSTEM, A METHOD OF CONTROLLING A LINEAR COMPRESSOR, A LINEAR COMPRESSOR AND COOLING SYSTEM

This application claims priority of Brazilian patent application No. PI0300010-9 the disclosure thereof being hereby incorporated by reference.

The present invention relates to a system of controlling a piston in a linear compressor, a method of controlling a piston in a linear compressor, as well as a linear compressor, particularly applicable to cooling systems that may include, for instance, refrigerators, air-conditioning systems and the like.

DESCRIPTION OF THE PRIOR ART

As it is known from the prior art, a linear compressor is usually inserted into a low-pressure environment, where a low-pressure gas is aspirated by the compressor, which compresses and releases it into a high-pressure environment associated to a cooling circuit, the low-pressure environment and the high-pressure environment being hermetically isolated from each other.

The air-compression mechanism is operated by axial movement of a piston inside a cylinder, suction valve and discharge valve being installed on a head, which regulate the entrance and exit of gas into and/out of the cylinder. The piston is driven by an actuator, which is formed by a support and a magnet, the latter being driven by a helical spring, forming a resonant assembly of the compressor.

The resonant assembly, driven by the linear motor, has the function of developing a linear alternating movement, causing the movement of the piston inside the cylinder to exert an action of compressing the gas admitted from the suction valve up to the point at which it may be discharged into the high-pressure side through the discharge valve.

The amplitude of the operation of the linear compressor is regulated with the balance of the power generated by the motor and the power consumed by the mechanism in compressing the gas plus the other losses. In order to extract the maximum pumping capacity of the compressor, it is necessary to approximate the piston as much as possible to the valve plate, but preventing it from bumping. In order to make this possible, the amplitude of the operation should be known in accuracy, and the greater the estimated error the greater the safety distance should be, to prevent collision of the piston with the valve plate. The collision of the piston generates noise and may damage the compressor, depending upon the constructive solutions of the latter.

In addition to the estimated precision of the piston position, the operation stability is equally important. If the operation amplitude varies with time, the proximity of the piston to the valve plate will also be impaired, or the piston may collide.

Another characteristic of said linear mechanism is the possibility of varying its pumping capacity. Reducing the power of the motor, the operation amplitude decreases and, in turn, the pumping capacity as well.

One of the prior-art techniques in which one has foreseen the need to prevent collision of the piston with the valve plate is disclosed in document WO 01/54253. According to the teachings of this document, one provides a system and a method applicable to a linear compressor, by which one foresees the measurement of a first square wave obtained by integrating the current applied to the motor and a second square wave obtained from the voltage applied to the motor. On the basis of these measurements, the movement of the piston is effected by means of a TRIAC, evaluating the difference between the phases of the first square wave and the second square wave. Consequently, the piston operates in a position closer to the valve plate.

In spite of reducing the chances of the piston colliding with the valve plate, the object of document WO 01/54253 does not approach problems resulting from possible unbalances related to the stability of the system itself as a whole and, consequently, the system may operate in non-ideal conditions in terms of stability.

In addition, another drawback resulting from the construction proposed in document WO 01/54253 lies in the fact that one monitors the phase by means of square waves. Such an approach has the result that, in order to obtain the difference between the phases, it will be necessary to employ electronic circuits or computer programs that effect the integration of the current, which generate the first and the second square waves described therein and that calculate the difference in phase between the first square wave and the second square wave. However, such a construction and the resultant process present a high manufacture cost, in addition to lesser reliability, since they need circuits to carry out these conversions, which, due to the large number of components involved, reduces the reliability of the system, because with each added component it presents a greater probability of failure. The option of implementing the device described in the document by means of a computer program also results in a high cost, since, in this case, with the approach used, an excessively sophisticated microcontroller is required, and so there is a high cost.

Another prior-art technique related to the present invention is described in document U.S. Pat. No. 5,342,176. According to the teachings of this document, one provides a method and an apparatus for measuring the position of a piston on a compressor, from which one measures the voltage and the current applied to the motor of the compressor so as to control the piston movement. One of the advantages of the invention described in this document is the fact that the approach requires a calculation specifically coupled to the piston development, without taking into consideration, for instance, the temperature changes in the cooler, which may lead to errors in the resolution of the system.

SUMMARY AND OBJECTIVES OF THE INVENTION

The objectives of the present invention are to provide a system for controlling the movement of a piston in a linear compressor and a method of controlling a piston, which prevent the piston from bumping against the valve plate, with the necessary pressure for the system to be efficient.

A varied parameter for controlling the compressor amplitude may be the feed voltage of the electric motor. From the feed voltage until the achievement of the desired amplitude there are various impedances coupled, such as: the electric motor resistance, the motor inductance, the capacitance if a capacitor is used, the contra-electro-drive force, the impedances of the resonant system (mass/spring) and the compression work with its inherent losses. The impedance of this system depends upon the respective driving frequency, that is to say, the frequency of the voltage applied to the motor. At a certain frequency, the output of this system is optimum, and this occurs when the mechanical system goes into resonance. At this frequency the performance of the linear compressor is maximum.

The resonance frequency of the mechanism is not perfectly fixed, since the gas to be compressed has a mechanical effect similar to that of a spring, which may be designated as "gas spring". The "gas spring" is mainly affected by two factors:
(i) the distance piston/valve plate; and
(ii) the pressures that the compressor operates or operational pressure.

The piston/plate distance or approach factor is altered when the piston stroke is reduced, generating an increase in the gas spring and in the mechanism resonance (this effect is more relevant for the operation stability of the mechanism).

In a cooling system these two factors—the approach factor and the operational pressure—change substantially, the operational pressure varies from the moment when the system is turned on until the operational rating is reached, whereas the operational rating is affected by the room temperature and the internal temperature of the cooler, the piston/plate distance being altered when the system needs more or less cooling capacity taking place in longer or shorter course and tension applied to the motor for the latter to operate adequately.

Thus, the resonance frequency of the mechanical system varies due to the various factors cited.

In order to approach the problems in an effective way, it would be recommendable to have an electronic device that could vary the frequency of the voltage applied to the motor, so as to always maintain the mechanism at the resonance. However, an electronic device of this kind, at the present state of the art, is not efficient and its cost is considerably high. For this reason, the system for controlling the movement of a piston in a linear compressor, as well as the respective method of controlling the compressor itself, which are objectives of the present invention, aim at controlling the voltage, thus preventing high costs for controlling the oscillation frequency of the voltage.

One of the problems that result from this approach lies in the fact that there are various impedances connected between the voltage applied to the motor until the mechanism of the linear compressor. An example of the effect of these impedances results in the following situations.

For cases in which the resonance frequency varies for greater factors, that is to say, in the cases where the resonance frequency is higher than the motor feed frequency (the latter is always constant), it will be necessary that the motor feed frequency should be increased to maintain the piston with the same amplitude as that available at the resonance frequency.

Starting from another point of view, when the resonance frequency decreases, that is to say, when the resonance frequency is also higher than the feed frequency, but the piston operation amplitude decreases, the resonance frequency will increase, and so there will be situations in which the voltage applied to the motor should be higher in order to maintain the piston at a smaller amplitude. This behavior generates instability in the control and may render the mechanism uncontrollable.

The objectives of the present invention are a system for controlling a linear compressor, a method of controlling a linear compressor, a linear compressor, and a cooling system. The piston is controlled so that the voltage applied to the motor can be constantly corrected in function of the operation characteristics of the compressor, for instance, due to the "gas spring" and for the voltage to reach the required level for maintaining the piston always in stable motion independently of the system conditions.

As a result of the above objective, it is a further objective of the present invention to provide a system for controlling a linear compressor, a method of controlling a linear compressor, a linear compressor, and a cooling system, wherein the compressor that operates at any amplitude in a stable way independently of being synchronized or not, whereby one can correct the voltage applied to the motor independently of the phase, and even maintain the system stable.

At the same time, the system for controlling a linear compressor, a method of controlling the linear compressor, a linear compressor, and the cooling system should provide a construction that is of mere implementation, with a reduced number of electronic components and, in addition, is still a construction with a low-cost microprocessor or a microcontroller.

The objectives of the present invention are achieved by means of a system for controlling a linear compressor, the linear compressor comprising a movable assembly, a motor fed by an application voltage, generating a circulating current in the motor, an electronic switching device, and an electronic circuit controlling the electronic switching device in order to control the application voltage applied to the motor, and the motor driving the movable assembly, the electronic circuit measuring the phase of actuating the current circulating in the motor and the dynamic phase of the movable assembly and establishing a relationship between the driving phase and the dynamic phase, determining a measured phase, the electronic circuit obtaining a value of a correction voltage from the value of the measures phase, the electronic circuit obtaining a value of a voltage defined from a physical position of the movable assembly, the electronic circuit actuating at the value of the application voltage from the sum of the correction voltage and the defined voltage, the dynamic phase being obtained from a velocity of displacement of the movable assembly, or from the comparison of the value of measurement of the physical position of the movable assembly with the defined physical position previously established.

The objectives are further achieved by means of a method of controlling a linear compressor, the linear compressor comprising a movable assembly, a motor fed by an alternating current generating a circulating current, the method comprising steps of measuring a phase of actuating the current circulating in the motor; measuring a dynamic phase of the movable assembly, establishing a relationship between the actuation phase and the dynamic phase, determining a measured phase; establishing a relationship between the measured phase and a physical position of the movable assembly determining a preferred position of the movable assembly; establishing a relationship between the measured phase and the preferred position, obtaining an application voltage; altering the voltage value in a way proportional to the value of the application voltage obtained.

The objectives of the present invention are further achieved by means of a linear compressor comprising: a movable assembly positioned inside a pressurization chamber and being operatively associated to a spring, the movable assembly moving axially inside the pressurization chamber, a motor fed by a voltage generating a current circulating in the motor, an electronic switching device, and an electronic circuit controlling the electronic switching device to control the voltage applied to the motor, and the motor driving the movable assembly, the control circuit measuring a phase of actuating the current circulating in the motor and a dynamic phase of the movable assembly and establishing a relationship between the actuation phase and the dynamic phase, determining a measured phase, the control circuit altering the value of the voltage applied to the motor in a way proportional to the value of the measured phase.

Further, the objectives of the present invention are achieved by means of a cooling system comprising a linear compressor comprising: a movable assembly positioned inside a pressurization chamber and being operatively associated to a spring, the movable assembly moving axially inside the pressurization chamber, a motor fed by a voltage generating a current circulating in the motor, an electronic switching device, and an electronic circuit controlling the electronic switching device to control the voltage applied to the motor, and the motor driving the movable assembly, the control circuit measuring a phase of actuating the current circulating in the motor and a dynamic phase of the movable assembly and establishing a relationship between the actuation phase and the dynamic phase, determining a measured phase, the control circuit altering the value of the voltage applied to the motor in a way proportional to the value of the measured phase.

BRIEF DESCRIPTION OF THE DRAWINGS

The present invention will now be described in greater detail with reference to an embodiment represented in the drawings. The figures show.

DETAILED DESCRIPTION OF THE FIGURES

Figure 1:
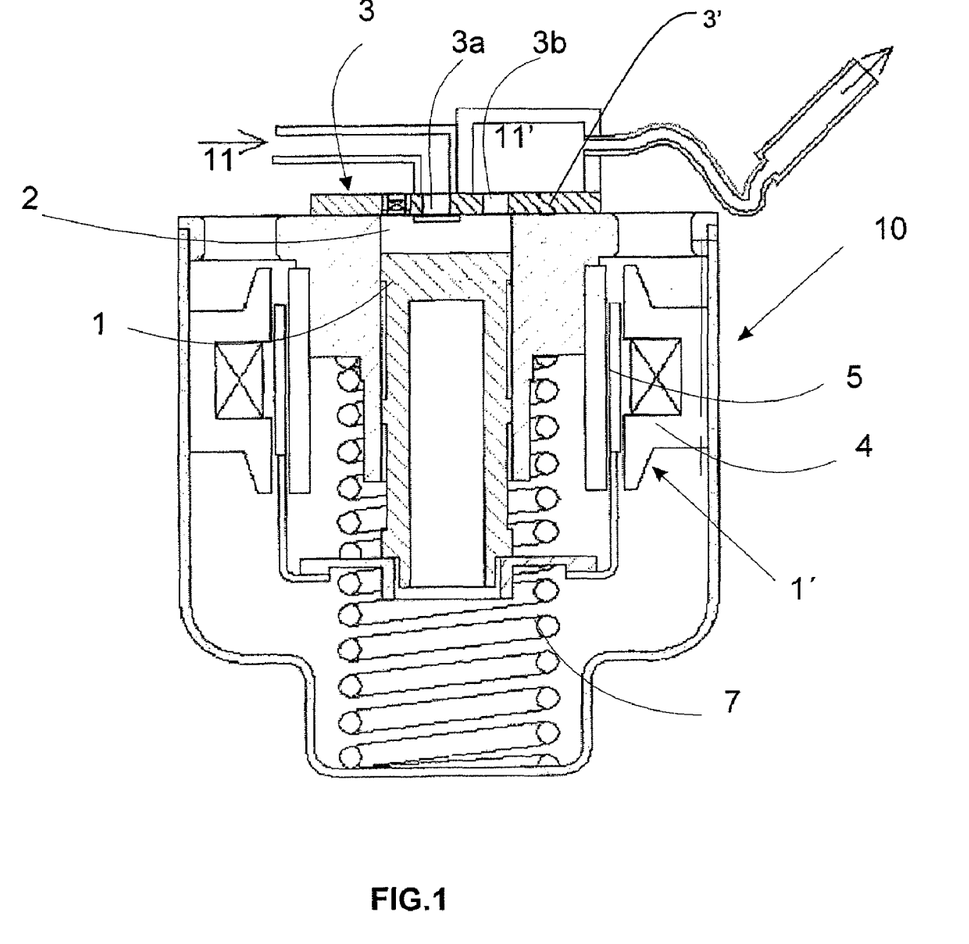
FIG. 1 is a schematic cross-section view of a linear compressor, wherein one can apply the teachings of the present invention.

As can be seen in FIG. 1, the linear compressor 10 is inserted into a low-pressure environment 11, where low-pressure gas is aspirated by the linear compressor 10, which compresses and releases it into a high-pressure environment 11'. As already described, a linear compressor 10 basically comprises a piston 1 or a movable assembly 1 positioned inside a cylinder or pressurization chamber 2 and moving axially within the latter, the movable assembly 1 moving towards a head 3.

On the head 3 there are suction valves 3a and discharge valves 3b, which regulate the entrance and exit of gas into and out of the cylinder 2, the movable assembly 1 being driven by an actuator or motor 1', which comprises a support 4 and a magnet 5. The movable assembly 1 is further associated to a helical spring 7, forming a resonant assembly of the liner compressor 10.

The gas-compression mechanism, as already described above, takes place by axial movement of the movable assembly 1 inside the cylinder 2, which moves now in the direction of the head 3 now in the opposite direction, thus configuring a displacement amplitude.

With a view to solve the stability problems mentioned above, according to the teachings of the present invention, one foresees a solution that approaches the problem by monitoring the current applied to the motor 1', so order to prevent collision of the movable assembly 1 with the head 3, where the valve plate 3' is located.

It is known that the current applied to the motor 1' is in phase with the speed of the movable assembly 1 when the mechanism is operating at the resonance. However, it is necessary to consider that the phase φ varies as it moves away from the resonance (see FIG. 3).

Figure 2:
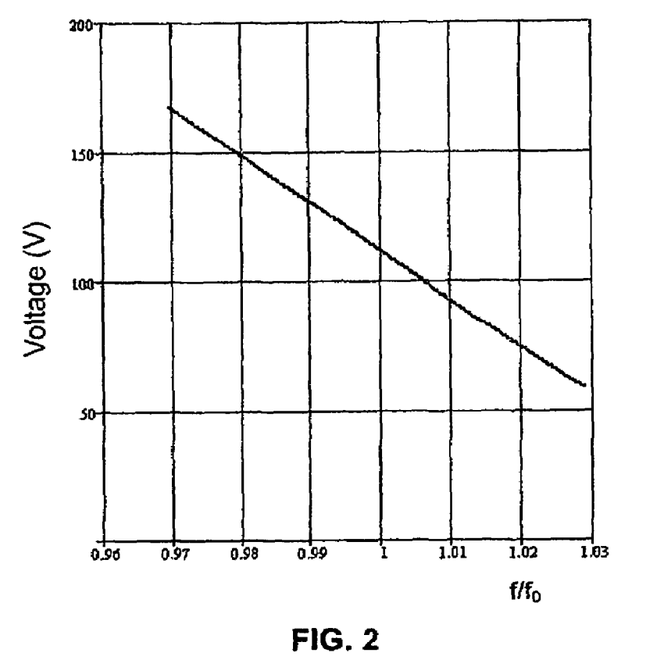
FIG. 2 shows a graph indicating, on the horizontal axis, the frequency relating to the resonance frequency ($f/f_0$), which represents how far the compressor piston is operating from the resonance frequency, and on the vertical axis the voltage necessary for the mechanism to operate at a constant amplitude.
Figure 3:
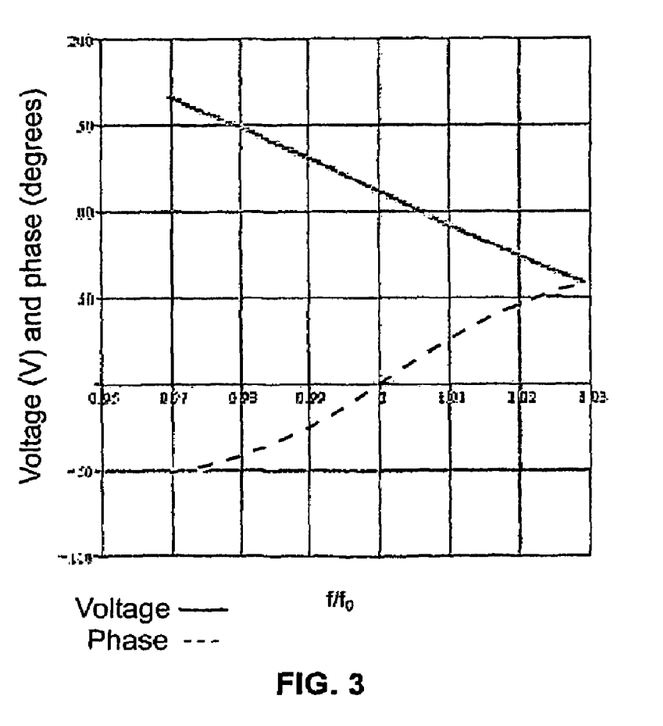
FIG. 3 shows a graph of the relationship between the phases, as illustrated in FIG. 2, as well as the relationship with the voltage.

FIGS. 2 and 3 illustrate the behavior of a cooling system, wherein the frequency varies. Thus, due to the impedances connected between the voltage applied to the motor 1' as far as the movable assembly 1 of the linear compressor 10, the resonance frequency $f_0$ has the behavior illustrated in FIG. 2. As can be seen, there was a variation in the resonance frequency $f_0$ for greater factors, knowing that the frequency f that feeds the motor 1' remains constant, the corresponding region in the graph is on the right of the resonance frequency $f_0$ (on the right point $f/f_0=1$), which means that the voltage necessary to maintain the movable assembly 1 at the same displacement amplitude should be increased.

Further, as can be seen in FIG. 2, when resonance the frequency $f_0$ decreases, the corresponding region is also located on the right of the resonance frequency $f_0$ (on the right of $f/f_0=1$). In this case, in an analogous way as the one recommended above, when the operation amplitude of the movable assembly 1 decreases, the resonance frequency increases and thus there are situations in which, to keep the movable assembly 1 at a lesser displacement amplitude, the voltage applied to the motor 1' should be higher, generating the instability in the control, which may render the mechanism uncontrollable and there may be impacts of the movable assembly 1 against the head 3.

Figure 4A:
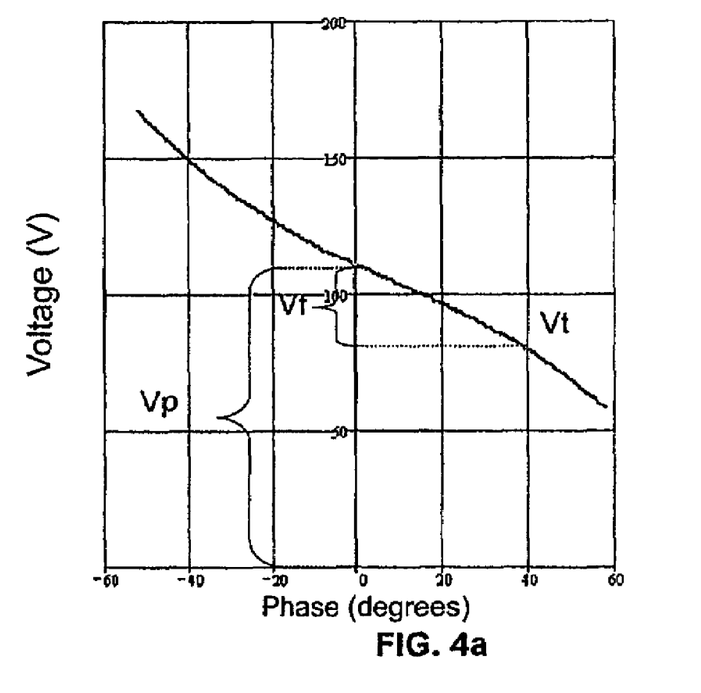
FIG. 4a shows a graph illustrating the relationship between the phases and the voltage for maintaining the mechanism at the same operation amplitude in an example where the phase is advanced by 40 degrees.
Figure 4B:
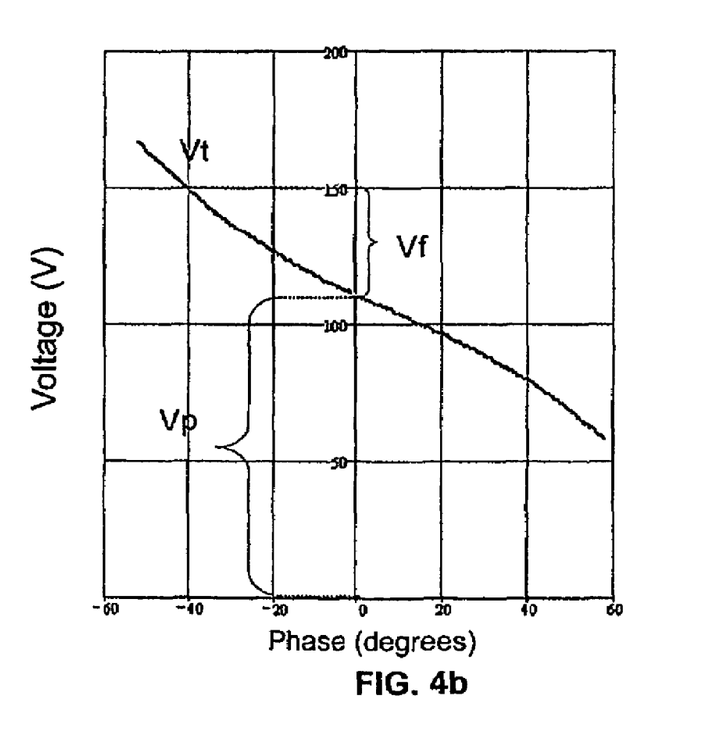
FIG. 4b shows a graph illustrating the relationship between the phases and the voltage for maintaining the mechanism at the same operation amplitude in an example where the phase is delayed by 40 degrees.
Figure 5:
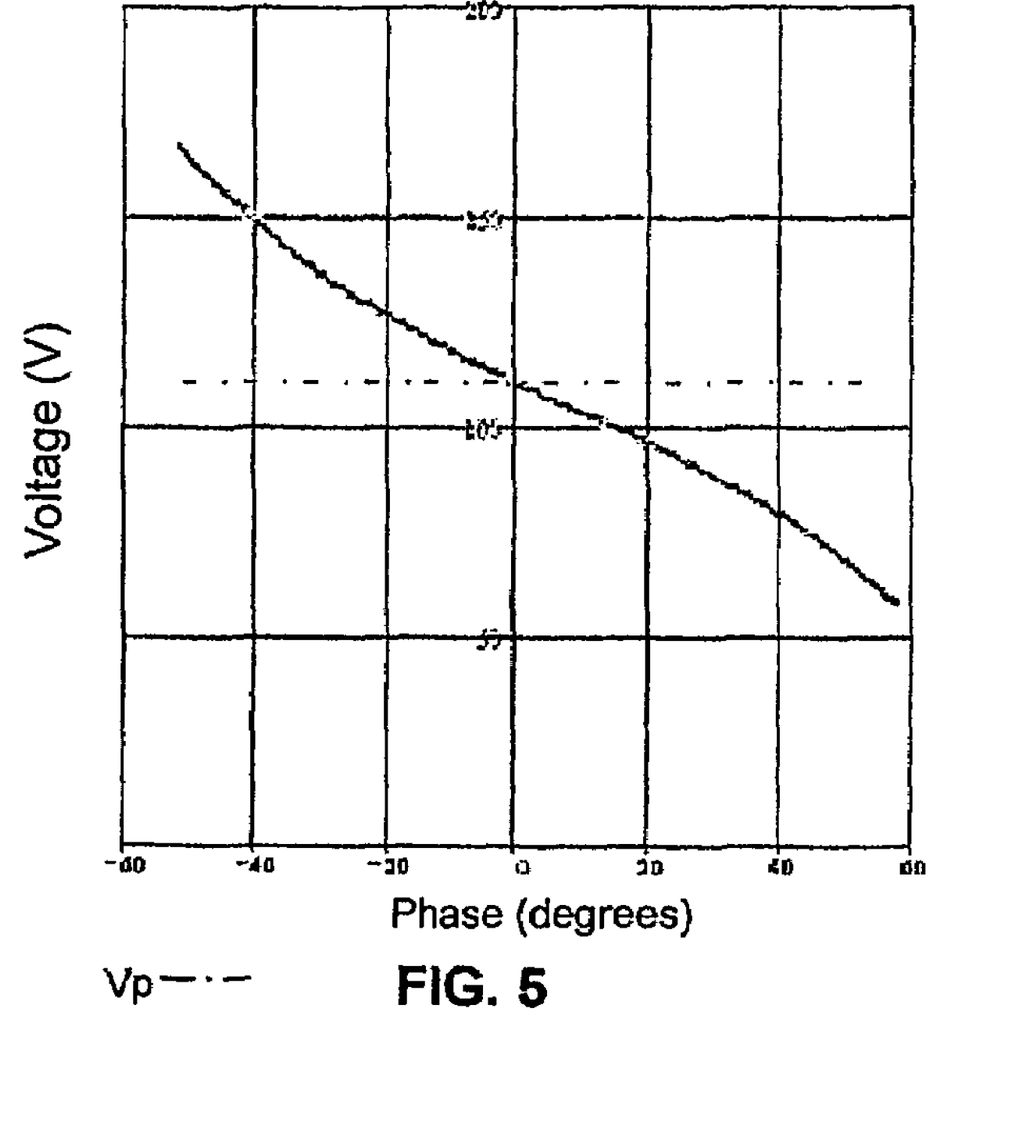
FIG. 5 shows a graph illustrating the behavior between the phase and the voltage altering the application voltage and illustrating the value of the defined voltage.

On the basis of the information above, one can establish a correction of the voltage with the phase φ (see FIG. 4), so that the control algorithm will not perceive the behavior of the graph illustrated in FIG. 2 or, in other words, even if the linear compressor 10 operates out of phase, the amplitude of movement of the movable assembly 1 should remain constant by controlling the voltage level applied to the motor 1'.

Further, with reference to FIGS. 3, 4a and 4b, one can note that the graph illustrated in FIG. 3 shows the phase and the voltage on the same graph, wherein one can see that, when the phase φ is zero, the mechanism is synchronized. On the other hand, on the graph illustrated in FIG. 4a and 4b, one can see, on the horizontal axis, the phase in question and on the vertical axis the voltage for keeping the mechanism at the same operation amplitude, this information being used by the control algorithm.

Mathematically, the foregoing is as follows:

$$V' = V - C(\phi)$$

wherein:

V is a voltage applied to the motor;

V' is a corrected voltage used by the control algorithm;

C(ϕ) is the voltage correction in function of the phase, for example, X ϕ, wherein K is a proportional constant that multiplies the phase; and ϕ is the phase between current and speed of the movable assembly, which may also be obtained by measuring the distance between the zero of the current and the instant of maximum displacement of the movable assembly.

As it is known, the value of the motor force is proportional to the current, so that, in order to facilitate the system, it is more recommendable to measure the current directly to obtain the value of the actuation phase $\phi_c$.

With regard to the value of the dynamic phase $\phi_P$, one can obtain it by directly measuring a point of displacement of the movable assembly 1, but one can obtain this value by reading the speed of the movable assembly 1, it being enough to integrate this value to reach the position magnitude again, since the speed and the displacement of the movable assembly 1 are at 90 degrees with each other.

Figure 8:
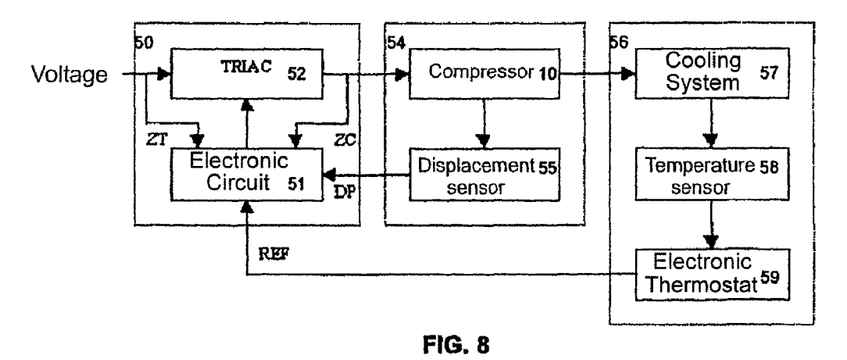
FIG. 8 shows a block diagram of a cooling system according to the teachings of the present invention.

As can be seen in FIG. 8, the object of the present invention may be carried out by means of a system of controlling a linear compressor 10 comprising the illustrated blocks, and such a control system may be applied, for instance, to a cooling system. This diagram is formed by three blocks that represent the control block 50 of the system of controlling a linear compressor 10, the compressor block 54 and the cooling block 56.

The control block 50 comprises:
an electronic circuit 51, which may include a microprocessor and its peripherals (not shown), and
a TRIAC or electronic switching device 52.

Such devices may evidently be replaced by other equivalent ones, as long as they meet the needs of the object of the present invention. Thus, instead of a microprocessor, one may use a microcontroller or else use discrete components, while the TRIAC may be replaced by other equivalent devices.

The compressor block 54, in turn, comprises:
a linear compressor 10 proper, and
a displacement sensor 55 of any type. Some types of sensors applicable in this case may include inductive sensors, contact sensors, accelerometer sensor or any other equivalent type, and all of them should have the capacity of monitoring the positioning of the movable assembly 1 within the cylinder 2.

The refrigeration block 56 comprises:
the cooling system 57 itself, including the whole cooling circuit (not shown);
a temperature sensor 58 necessary for controlling the temperature of the environment to be cooled, for instance, within a cooler or within an environment/room subjected to a cooling system; and
an electronic thermostat 59.

Specifically, the block diagram shows that the control block 50 receives the signal from the feed voltage, the value of which is controlled by the assembly formed by the electronic circuit 51 associated to the electronic switching device 52. From the entrance of the electronic switching device 52, one measures a zero signal of the voltage overvoltage ZT, which is fed to the electronic circuit 51, further measuring the zero signal of the current that goes through the circuit or circulating current ZC at the exit of the electronic switching device 52. The electronic circuit 51 is also fed by the signal of displacement of the movable assembly or physical position DP of the movable assembly 1 and the signal generated by the electronic thermostat 59.

Figure 9:
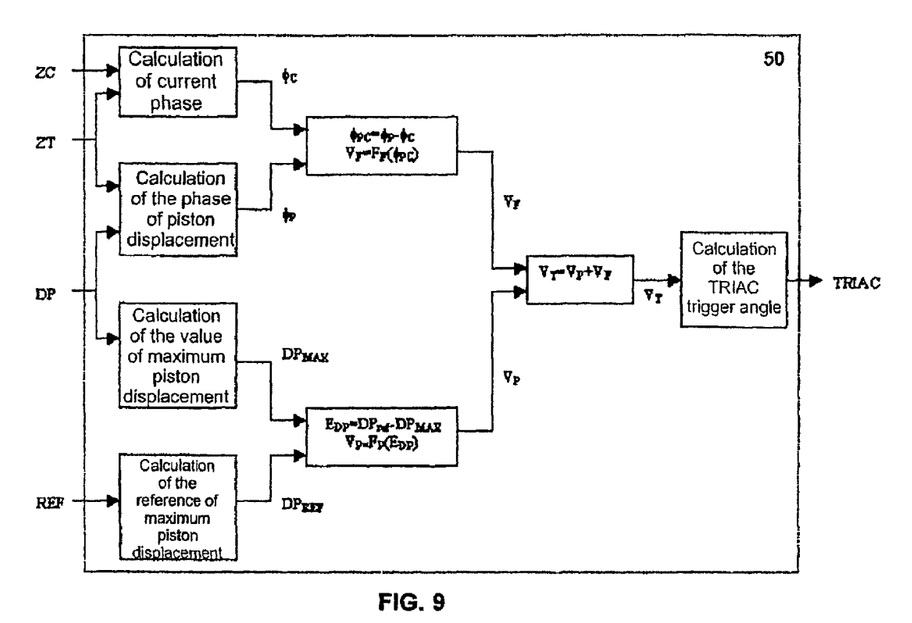
FIG. 9 shows a block diagram of a cooling system according to the teachings of the present invention illustrating the effects of controlling the voltage on the motor.

As can be seen in FIG. 9, the algorithm applied to the control system, control method, as well as the linear compressor and cooling system of the present invention, is controlled by the electronic circuit 51, which receives the signals indicated above.

Thus, according to this preferred embodiment, the signals of zero level of voltage ZT of the voltage applied to the motor 1' and zero level of current ZC of the current circulating in the motor 1', as well as the displacement of the movable assembly DP are interpreted so as to obtain:

the current phase in function of a given reference or, in other words, the actuation phase ϕC, and the maximum point phase or, in other words, the dynamic phase ϕp of the displacement of the movable assembly 1, or the shorter distance between the movable assembly 1 and the head 3, in function of the same reference of the current phase in function of a given reference. By subtracting these values by the equation:

$$\phi_{PC} = \phi_P - \phi_C$$

one obtains the value of the measured phase $\phi_{PC}$ between the zero of the current ZC and the maximum movement point DPmax or preferable position DPmax of the movable assembly 1 and, since the value of the correction voltage value $V_F$ generated from the measurement of the phase, it is a function of the value of the measured phase $\phi_{PC}$ between the zero of the current and the maximum point of movement of the movable assembly DPmax, this relationship is then established.

One of the ways of obtaining the value of the correction voltage according to the above teachings may be by means of a classic closed-mesh control algorithm such as a PID, for example. The function may be directly obtained.

Further with regard to the measurement of the value of the measured phase $\phi_{PC}$, a possible way of obtaining such a magnitude is carried out by measuring the instant of the current extinction until the measurement of the instant of triggering the electronic switching device 52; one calculates a first average instant of these points. In addition, one measures the instant at which the movable assembly 1 has passed beyond the maximum point of movement DPmax and the instant at which the piston returned to a farther point from the head 3 than the maximum point of the movement DPmax, calculating a second average instant of these values. Starting from the value of the first average instant and the second average instant, one obtains a time difference ΔT that is proportional to the phase between the zero of the current and the maximum point of the movement DPmax. If the difference in time ΔT for the period of a cycle of the frequency of actuation of the linear compressor is multiplied by 360, one obtains the phase in degrees. However, knowing that the time difference ΔT is proportional to the measured phase $\phi_{PC}$, one may dispense with the calculation from the frequency and, consequently, reduce the complications of the system.

As described above, the actuation phase ϕp can be obtained directly from the current, but it may also be obtained from other parameters, such as, for example, from the speed of the movable assembly 1.

On the basis of the value of the signal of physical position DP fed to the electronic circuit 51 and the resistance value read by the electronic thermostat 59, one can establish the values of maximum displacement of the movable assembly DPmax and of the reference displacement $DP_{REF}$ (a displacement that is intended to reach a defined physical position) and, by subtracting such values by the equation:

$$E_{DP} = DP_{REF} - DP_{MAX}$$

one obtains the value of the error $E_{DP}$ between the reference displacement $DP_{REF}$ and the maximum displacement of the movable displacement $DP_{MAX}$.

From this result, it is possible to obtain the value of the defined vulture $V_P$ established by the control algorithm, since the value of the latter is a function of the value of the error $E_{DP}$.

Starting from the values of the correction voltage generated by the phase and the value of the defined voltage $V_P$ by the control algorithm, one applies the equation:

$$V_T = V_P + V_F$$

and obtains the value of the voltage applied to the motor 1' or the application voltage $V_T$. Such a value application voltage $V_T$ should be regulated by the angle of triggering the electronic switching device 52 controlled by the electronic circuit 51.

The value/signal $DP_{REF}$ is an information received from an external system such as, for example, coming from a cooling system, the value/signal treated by the system of the present invention changing into a DC level.

The signal DP is that generated by a transducer or any displacement sensor 55 applied to measure the signal of course of the movable assembly 1, and the transducer may be, for example, an inductive sensor. As it is known, the signal generated by an inductive-type sensor is inversely proportional to the distance of the movable assembly 1 from the head 3. The maximum peak value of this signal measured by the inductive sensor will be, in this example, $DP_{MAX}$, $DEP_{REF}$-$DEP_{MAX}$ being the error of the control algorithm.

Figure 7:
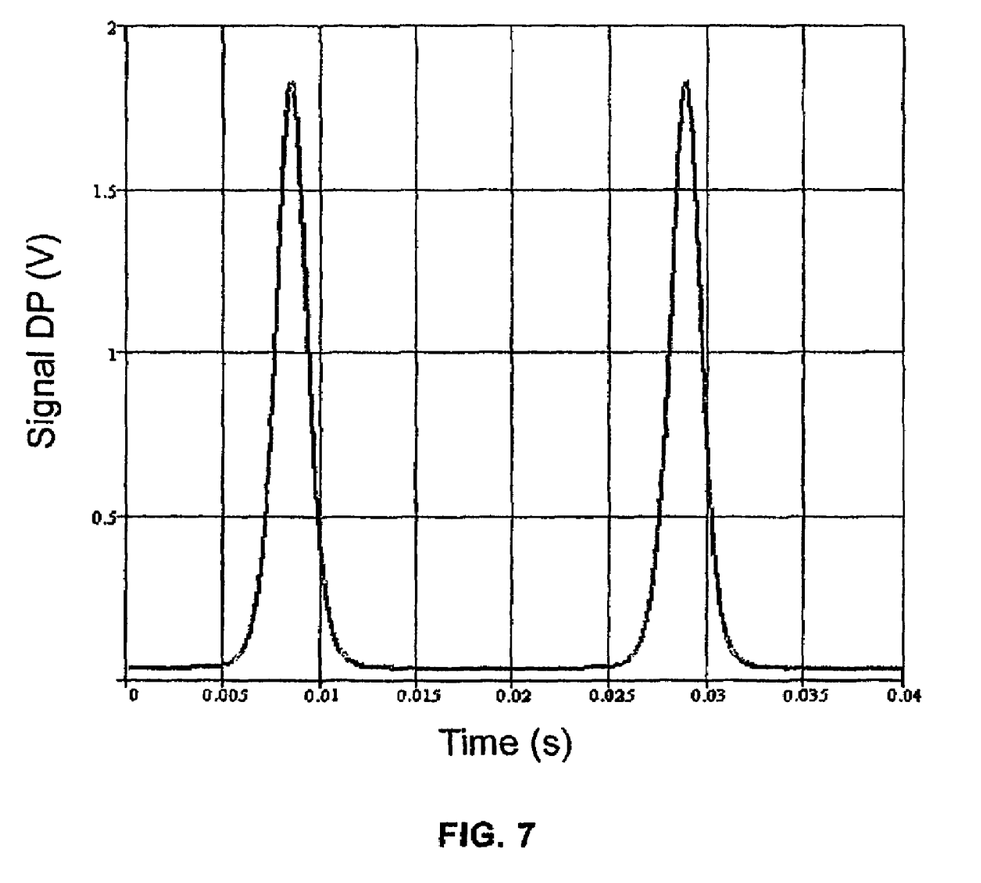
FIG. 7 shows an example of measurement made on a linear compressor.

FIG. 7 illustrates an example of measurement made on a linear compressor 10, wherein one can see the signal DP generated by an inductive with its corresponding signal coordinator. With every approach of the movable assembly 1 to the valve plate 3', the sensor generates a voltage inversely proportional to this distance. The maximum approach values 1.8V seen in the graph correspond to the maximum approach of the movable assembly, which is the value $DP_{MAX}$.

Further with regard to FIGS. 4a and 4b, one can note, in an embodiment, that the movable assembly 1 will be operating without lag when the application voltage $V_T$ is equal to 110V. Considering, as an example, a point where the phase φ of the circulating current in the motor 1' is advanced by 40 degrees with respect to the speed of the movable assembly 1 (see FIG. 4a), the application voltage $V_T$ will be of approximately 80V and should be high for the movable assembly 1 to continue operating in a stable way, that is to say, independently of the phase, the movable assembly 1 will operate without the risk of bumping against the head 3. Moreover, as can be seen, in this way the system can continue to operate out of phase without this interfering with the good functioning of the compressor and of the cooling system where it is used.

One can observe that the electronic circuit 51, by means of the electronic switching device 52, should subtract from the defined voltage $V_P$ (in this case equal to 110V) the value of the correction voltage $V_F$ (in this case equal to 30V), so that the motor 1' can be fed with the application voltage $V_T$ of 80 V. Consequently, the system of controlling a linear compressor will keep the system operating in a balanced way, preventing collision of the movable assembly 1 with the head 3, thus preventing damages to the compressor.

FIG. 4b illustrates a situation in which the phase φ of the current circulating in the motor 1' is delayed by 40 degrees with respect to the speed of the movable assembly 1. In order to correct this problem, the defined voltage $V_P$ (having a value of 110V in the example), should have the value of the correction value $V_F$ ( in this case the remaining 40 V) added to it, so that the application voltage will be of 150V, as illustrated in the graph. From this sum, the movable assembly 1 will continue to operate in a balanced way.

Figure 6:
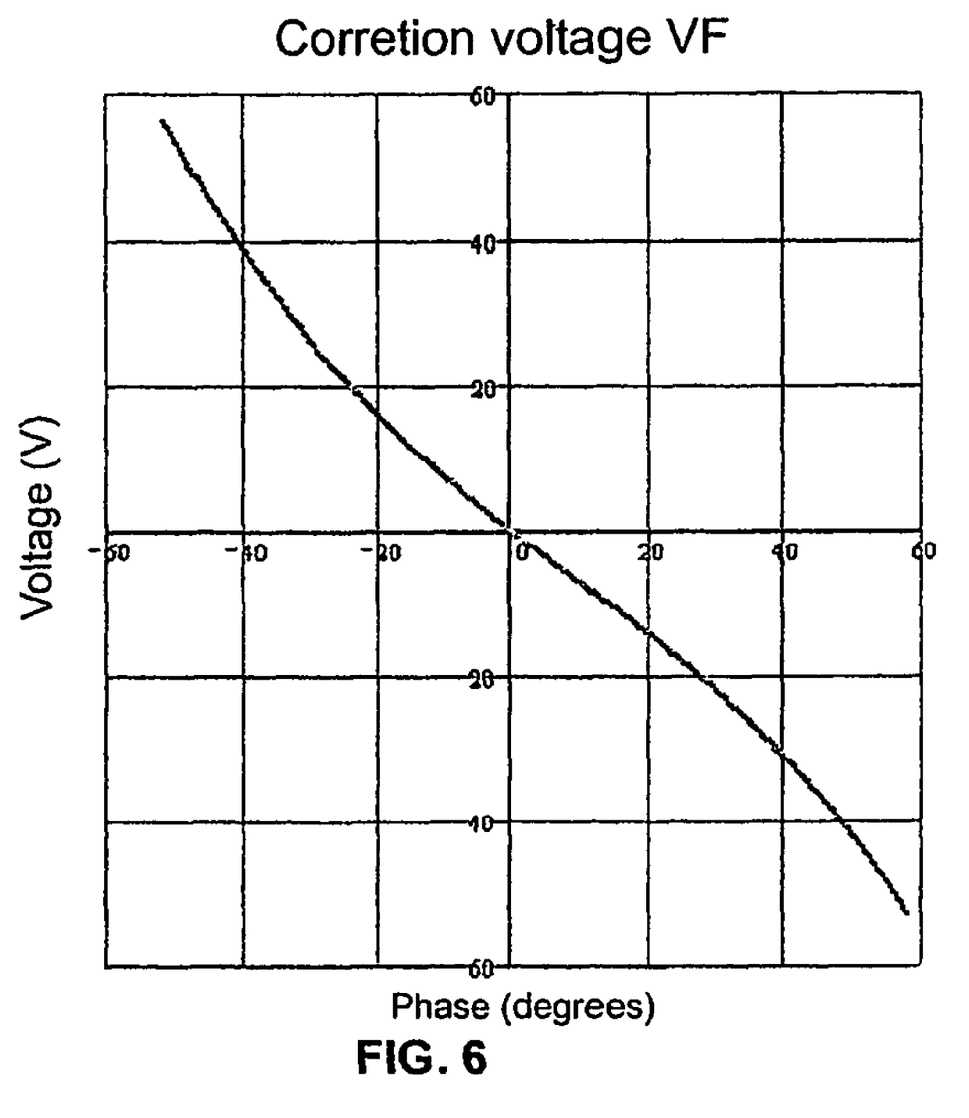
FIG. 6 shows a graph illustrating the behavior between the phase and the correction voltage.

The value of the correction voltage $V_F$ can be obtained directly by means of a table of values recorded on the control circuit 51 or else by means of a factor multiplying the measured values by a constant K, as in the above-cited example. FIG. 6 illustrates a graph where one can see, by an example, the correction voltage $V_F$ necessary to each phase, so that the system can operate in balance. One can see that the line of the voltage $V_T$ varies according to the measured phase $\phi_{PC}$, thereby to maintain the movable assembly 1 within the expected conditions, independently of the lag between the actuation phase $\phi_C$ and the dynamic phase $\phi_P$ of the movable assembly 1 and, consequently, the "gas-spring" effect.

The advantages of the object of the present invention result in that it is possible to operate the linear compressor 10 with more stability, permitting a greater approach of the movable assembly to the head 3, and it is possible to extract a greater pumping capacity of a given compressor and to operate the linear compressor 10 in situations where a classic algorithm does not work. In addition, the system of the present invention avoids the use of expensive microprocessors or microcontrollers, since the algorithm employed does not involve a number or routines when compared with the systems of the prior art, the present invention further resulting in a small number of components, which increases the reliability of the system.

Further according to the teachings of the present invention, as can be seen in FIG. 9, in order to implement the use of the system for controlling a linear compressor, one should establish the following steps, which are resultant from the use of the system itself and that are also applicable to the compressor and cooler of the present invention:

to obtain the zero level of current ZC of the current circulating in the motor 1';

to measure the actuation phase $\phi_C$ of the current circulating in the motor 1';

to obtain the zero phase of voltage ZT of the application voltage VT applied to the motor 1';

to measure the dynamic phase $\phi_P$ of the movable assembly 1', to establish the relationship between the actuation phase $\phi_C$ and the dynamic phase $\phi_P$, determining a measured phase $\phi_{PC}$, the established relationship being subtracted from the value of the dynamic phase $\phi_P$ of the value of the actuation phase $\phi_C$;

to establish a relation ship between the measured phase $\phi_{PC}$ and the physical position DP of the movable assembly 1, determining the preferably position $DP_{MAX}$ of the movable assembly 1;

to compare the value of the preferred position $DP_{MAX}$ and the defined physical position $DE_{PREF}$ previously establish to obtain a value of a defined voltage $V_P$;

to alter the value of the application value $V_T$ in a way proportional to the value of the application voltage $V_T$ obtained, by means of the sum of the values of the defined voltage $V_P$ and of the correction voltage $V_F$.

Further according to the teachings of the present invention, one can provide a linear compressor having the constructive characteristics already described and being provided with the control circuit 51, measuring the actuation phase $\phi_C$ of the current circulating in the motor 1' and a dynamic phase $\phi_P$ of the movable assembly 1 to establish a relation between the actuation phase $\phi_C$ and the dynamic phase $\phi_P$, determining the measured phase $\phi_{PC}$, the control circuit 51 altering the value of the application voltage $V_T$ applied to the motor 1' in a way proportional to the value of the measured phase $\phi_{PC}$, being also a cooling system having a linear compressor. In these cases, it is possible to construct a cooling system having greater efficiency and, at the same time, a low cost when compared with the systems of the prior art.

Preferred embodiments having been described, it should be understood that the scope of the present invention embraces other possible variations, being limited only by the contents of the accompanying claims, which include the possible equivalents.

The invention claimed is:

1. A system for controlling a linear compressor (10), the linear compressor (10) comprising:
   a movable assembly (1);
   a motor (1') fed by an application voltage ($V_T$), an electronic switching device (52); and
   an electronic circuit (51) controlling the electronic switching device (52) to control the application voltage ($V_T$) applied to the motor (1'), and the motor (1') driving the movable assembly (1);
   the system being characterized in that:
   the electronic circuit (51) measures an actuation phase ($\phi_C$) of the current circulating in the motor (1') and a dynamic phase ($\phi_P$) of the movable assembly (1) and establishes a relationship between the actuation phase ($\phi_C$) and the dynamic phase ($\phi_P$), determining a measured phase ($\phi_{PC}$),
   the electronic circuit (51) obtains a value of a correction voltage ($V_F$) from the value of the measured phase ($\phi_{PC}$),
   the electronic circuit (51) obtains a value of a defined voltage ($V_P$) from a physical position (DP) of the movable assembly (1),
   the electronic circuit (51) actuates on the value of the application voltage (VT) from the sum of the correction voltage ($V_F$) and the defined voltage ($V_P$).

2. A system according to claim 1, characterized in that the dynamic phase ($\phi_P$) is obtained from a velocity of displacement of the movable assembly (1).

3. A system according to claim 2, characterized in that the electronic system (51) determines the value of the defined voltage ($V_P$) from the comparison of the value of the measurement of the physical position (DP) of the movable assembly (1) with a previously established defined physical position ($DP_{REF}$).

4. A system according to claim 3, characterized in that the electronic circuit (51) commands the electronic switching device (52) to apply application voltage ($V_T$) to the motor (1').

5. A system according to claim 4, characterized in that the electronic circuit (51) obtains the value of the actuation phase ($\phi_C$) from the comparison of measurements of phases of a zero level of voltage (ZT) of the application voltage (VT) applied to the motor (1') with a zero level of current (ZC) of the circulating current in the motor (1').

6. A system according to claim 5, characterized in that the electronic circuit (51) obtains the value of the dynamic phase ($\phi_P$) from the comparison of measurements of the physical position (DP) of the movable assembly (1) with the measurement of the zero level of the voltage (ZT) applied to the motor (1').

7. A system according to claim 6, characterized in that the value of the defined voltage ($V_P$) is obtained from a relationship between the value of a maximum physical position ($DP_{MAX}$) proportional to the value of the physical position (DP) and the defined physical position ($DE_{REF}$).

8. A system according to claim 7, characterized by being applicable in a cooling system (57) comprising a temperature sensor (58) associated to an electronic thermostat (59), the electronic thermostat (59) supplying the value of the previously established defined physical position ($DE_{REF}$).

9. A system according to claim 8, characterized by comprising a displacement sensor (55) associated to the control circuit (51), the control circuit (51) receiving the value of the physical position (DP) of the movable assembly (1).

10. A system according to claim 9, characterized in that the signal of zero level of voltage (ZT) of the application voltage ($V_T$) applied to the motor (1') is measured at the entrance of the electronic switching device (52).

11. A system according to claim 10, characterized in that the signal of zero level of current (ZC) of the circulating current in the motor (1') is measured at the exit of an electronic switching device (52).

12. A system according to claim 11, characterized by operating in an stable way, independently of the difference between the dynamic phase ($\phi_P$) and the actuation phase ($\phi_C$).

13. A method of controlling a linear compressor (10), the linear) compressor (10) comprising:
    a movable assembly (1);
    a motor (1') fed by an alternating application voltage ($V_T$), generating a circulating current; the method being characterized by comprising the steps of:
    measuring an actuation phase ($\phi_C$) of the circulating current in the motor (1');
    measuring a dynamic phase ($\phi_P$) of the movable assembly (1),
    establishing a relationship between the actuation phase ($\phi_C$) and the dynamic phase ($\phi_P$), determining a measured phase ($\phi_{PC}$);
    establishing a relationship between the measured phase ($\phi_{PC}$) and a physical position (DP) of the movable assembly (1), determining a preferable position ($DP_{MAX}$) of the movable assembly (1);
    establishing a relationship between the measured phase ($\phi_{PC}$) and the preferable position ($DP_{MAX}$), obtaining an application voltage ($V_T$) to be applied to the motor (1').

14. A method according to claim 13, characterized in that, prior to the step of establishing the relationship between the measured phase ($\phi_{PC}$) and the preferable position ($DP_{MAX}$), the method comprises a step of comparison between the value of the preferable position ($DP_{MAX}$) and a previously established defined physical position ($DP_{REF}$) to obtain a value of a defined voltage ($V_P$).

15. A method according to claim 14, characterized in that, in the step of altering the value of the application voltage ($V_T$), the value of the application voltage ($V_T$) is obtained by summing the values of the defined voltage ($V_P$) and of the correction voltage ($V_F$).

16. A method according to claim 15, characterized in that, prior to the step of measuring the actuation phase ($\phi_C$) of the circulating current in the motor (1'), a step of obtaining a zero level of current (ZC) of a circulating current in the motor (1') is foreseen.

17. A method according to claim 16, characterized in that, prior to the step of measuring the dynamic phase ($\phi_P$) of the movable assembly (1), the step of obtaining a zero level of voltage (ZT) of the application voltage ($V_T$) applied to the motor (1') is foreseen.

18. A linear compressor (10) comprising:
    a movable assembly (1) positioned inside a pressurization chamber (2) and being operatively associated to a spring (7), the movable assembly (1) moving axially within the pressurization chamber (2);
    a motor (1') fed by an application voltage (VT), generating a circulating current in the motor (1');

an electronic switching device (52); and an electronic circuit (51) controlling the electronic switching device (52), to control the application voltage (VT) applied to the motor (1'), and the motor (1') driving the movable assembly (1); the linear compressor (10) being characterized in that:

the control circuit (51) measures an actuation phase ($\phi_C$) of the circulating current in the motor (1') and a dynamic phase ($\phi_P$) of the movable assembly (1) and establishes a relationship between the actuation phase ($\phi_C$) and the dynamic phase ($\phi_P$), determining a measured phase ($\phi_{PC}$), the control circuit (51) alters the value of the application voltage (VT) applied to the motor (1') in a way proportional to the value of the measured phase ($\phi_{PC}$).

19. A compressor according to claim 18, characterized in that the measured phase ($\phi_{PC}$) corresponds to the lag between the actuation phase ($\phi_C$) and the dynamic phase ($\phi_P$) of the movable assembly (1).

20. A compressor according to claim 19, characterized by operating in a stable way, independently of the difference between the dynamic phase ($\phi_P$) and the actuation phase ($\phi_C$).

21. A cooling system characterized by comprising a compressor as defined in any one of claims 18 to 20.

* * * * *